Jan. 5, 1960     B. J. VOCKE     2,919,739

WHEEL COVER LOCK

Filed Nov. 6, 1958

INVENTOR
BERNARD J. VOCKE

BY *William R Jacox*

HIS ATTORNEY

United States Patent Office 2,919,739
Patented Jan. 5, 1960

---

2,919,739

WHEEL COVER LOCK

Bernard J. Vocke, Dayton, Ohio

Application November 6, 1958, Serial No. 772,328

11 Claims. (Cl. 152—431)

This invention relates to a wheel cover lock. The invention relates more particularly to a combined wheel cover lock and valve stem cap.

It is an object of this invention to provide a locking device for an automobile wheel cover.

It is another object of this invention to provide a wheel cover lock in combination with a valve stem cap.

It is another object of this invention to provide such a wheel cover lock and valve stem cap unit which includes means for operation of a valve member within the valve stem without removal of the lock and cap unit from the valve stem.

It is another object of this invention to provide such a wheel cover lock and valve stem cap which tightly closes the valve stem without the use of auxiliary dust cap means.

It is another object of this invention to provide such a lock device which is extremely difficult to remove without the proper key.

Other objects and advantages reside in the construction of parts, the combination thereof, the method of manufacture, and the mode of operation, as will become more apparent from the following description.

Figures 1, 2:
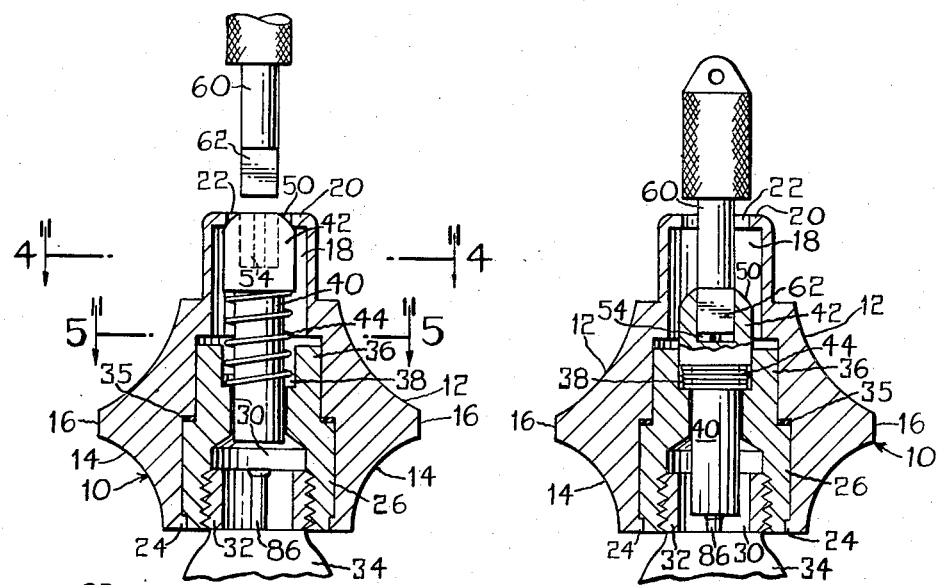
Figure 1 is an enlarged sectional view of a wheel cover lock of this invention with the elements thereof in normal position.
Figure 2 is a sectional view, similar to Figure 1, showing the wheel cover lock of this invention with a key member inserted therein during rotation of the cap member with respect to the housing.

Referring to the drawing in detail, a wheel cover lock member of this invention comprises a housing 10 which is shown as having arcuate portions 12 and 14 forming a peripheral flange 16.

The housing 10 is provided with a cavity 18 extending therethrough. One end of the housing 10 is provided with a wall 20 having an opening 22 leading to the cavity 18. The other end of the housing 10 is provided with a small flange or inwardly turned portion 24 forming an opening leading to the cavity 18. The flange 24 retains a cap member 26 within the cavity 18. The cap member 26 is rotatably disposed within the cavity 18. The cap member 26 has a passage 30 extending therethrough.

One end of the passage 30 is provided with threads for attachment to a threaded end portion 32 of a valve stem 34. The other end of the cap member 26 is provided with protuberances or engagement portions 36 forming a socket 38. At the periphery of the cap member 26 intermediate the ends thereof a sealing member 35 may be provided.

An elongate pin member 40 is disposed within the cavity 18 of the housing 10 and extends between the protuberances 36 and into the passage 30 of the cap member 26. The pin member 40 is provided with a head 42. A helical spring member 44 encircles the pin member 40 and has one end disposed within the socket 38 of the cap member 26. The other end of the spring member 44 is in engagement with the head 42 of the pin member 40. The spring member 44 urges the pin member 40 into engagement with the wall 20 of the housing 10. The head 42 is larger than the opening 22 but has arcuate upper edge portions 50 adapted to engage the wall 20 at the edges of the opening 22. Thus, the head 42 when in engagement with the wall 20 firmly closes the opening 22.

Due to the fact that the head 42 of the pin member 40 firmly closes the opening 22 in the wall 20 of the housing 10 an additional dust cap is not required.

Figure 4:
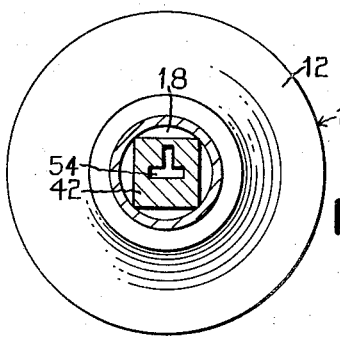
Figure 4 is a sectional view taken substantially on line 4—4 of Figure 1.
Figure 5:
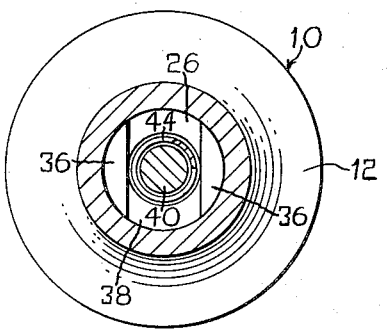
Figure 5 is a sectional view taken substantially on line 5—5 of Figure 1.

The head 42 of the pin member 40 is provided with a key slot or abutment portion of any suitable size or shape. Herein a key slot 54, which is shown in Figure 4 as being substantially T-shaped, is formed in the upper portion of the head 42 of the pin member 40. A key or tool 60 has an end portion 62 adapted to fit into the T-shaped key slot 54 in the head 42.

The lower portion of the head 42 of the pin member 40 is somewhat rectangular in cross section as shown in Figure 4 and is of such size that the head 42 may snugly fit into the socket 38 formed between engagement portions 36 in the upper end of the cap member 26, as shown in Figure 2. The key or tool 60 is used to force the pin member 40 downwardly, against the resiliency of the spring 44, and into the socket 38 formed by the protuberances 36, as shown in Figure 2. It is necessary that the head 42 fit into the socket 38 in order to attach the cap member 26 to a valve stem. Only the proper tool or key 60 may fit into the T-shaped key slot 54 in the head 42 for locating the head 42 in the socket 38 and for rotating the cap member 26 by means of the head 42. Thus, the pin member 40 with the head 42 serves as a wrench which fits into the socket 38 and which is operable only by means of the key 60.

Thus, it is necessary to use the proper key 60 in order to attach the cap member 26 to the threaded portion 32 of the valve stem 34, as shown in Figure 2. Obviously, it is also necessary to have the proper tool or key 60 in order to remove the cap member 26 from the threaded portion 32 of the valve stem 34.

Figure 6:
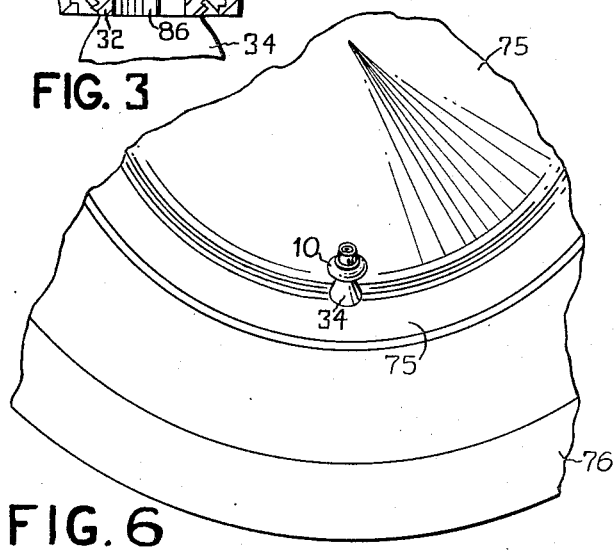
Figure 6 is a fragmentary elevational view showing a tire and wheel cover with a valve stem of the tire extending through an aperture in the wheel cover. This figure is drawn on a scale different from that of the other figures and shows a wheel cover lock of this invention attached to the valve stem.

The wheel cover lock member of this invention is thus attached to the valve stem 34, as shown in Figure 6. The valve stem 34 extends through an aperture in a wheel cover 75. The valve stem 34 communicates with the internal portions of a tire 76 for inflation of the tire 76. The housing 10 is larger than the aperture in the wheel cover 75. Therefore, when the cap member 26 is attached to the valve stem 34, the wheel cover 75 may not be removed.

Figure 3:
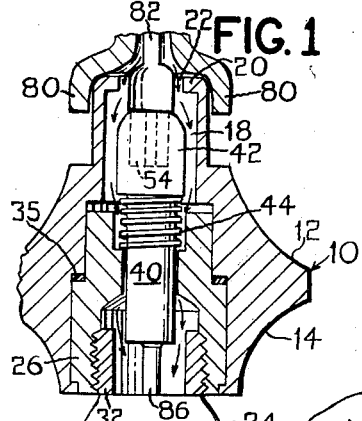
Figure 3 is a sectional view, similar to Figures 1 and 2, of the wheel cover lock of this invention showing the elements thereof in positions during inflation of a tire having the wheel cover lock attached to the valve stem thereof.

The lock member of this invention, when attached to a valve stem, does not interfere with the normal operation of inflating or deflating a tire. As shown in Figure 3, when it is desired to inflat the tire 76 the conventional air hose fitting 80 at the end of an air line or hose (not shown), is placed into engagement with the wall 20 of the housing 10. The air hose fitting 80 has a valve operator 82 which extends through the opening 22 in the wall 20 and engages the head 42 of the pin member 40. When the valve operator 82 engages the head 42 of the pin member 40, the pin member 40 is depressed against the forces of the spring member 44 so that the pin member 40 moves axially within the passage 30 of the cap member 26 and the opposite end of the pin member 40 engages a valve core or valve operator 86 which is disposed within the valve stem 34. Thus, the pin member 40 opens the valve within the valve stem 34 so that air may flow into the valve stem 34 through the fitting 80, through the opening 22, into the cavity 18, through the passage 30, into the valve stem 34, and through the valve therein which is opened due to the fact that the valve operator or core 86 is depressed.

It is to be understood that the valve operator or core 86 is also depressed, as shown in Figure 2, when the cap member 26 is attached or detached from the valve stem 34. The valve within the valve stem 34 is open when the key member 60 has forced the head 42 of the pin member 40 into the socket 38 of the cap member 26 during attachment of the cap member 26 to the valve stem 34 or during removal of the cap member 26 from the valve stem 34. However, the amount of air released through the valve stem 34 during such attachment or detachment of the cap member 26 is usually very small due to the fact that the operation can be carried out quickly and readily.

Thus, it is understood that the wheel cover lock unit of this invention serves to prevent removal of a wheel cover and also serves as a dust cap for a valve stem. The unit includes means by which a valve within the valve stem may be operated without removal of the unit from the stem.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A wheel cover lock adapted for attachment to a valve stem having a threaded portion comprising a housing having a cavity therein open at opposite ends thereof, a cap member rotatably disposed within the cavity of said housing, the cap member having a passage therethrough, an end portion of the passage being threaded for threaded attachment to the threaded portion of a valve stem, the other end of the cap member having a socket communicating with the passage, a pin within the cavity of the housing and extending through the socket and into the passage of the cap member, a spring engaging said pin and said cap member and urging the pin in a direction from the cap member, the pin having a key slot in the end thereof, the pin having a head movable into the socket of the cap member for rotation of the cap member by means of a key disposed within the slot of the pin.

2. A combination valve stem cap and wheel cover lock comprising a housing having a cavity therein open at opposite ends thereof, a cap rotatably carried within the cavity, the cap having a passage therethrough, the cap having an engagement portion, the cap also having internal threads for attachment to a valve stem, a pin within the cavity of the housing and extending into the passage of the cap, the pin being axially movable so that one end thereof is engageable with a valve member within said valve stem to which the cap is attached, resilient means urging the pin in a direction from said valve member, the pin having a portion engageable with the engagement portion of the cap for rotation thereof, the pin having a portion engageable by a key for rotation thereof.

3. A combination valve stem cap and wheel cover lock comprising a housing having a cavity therein, the housing having walls at opposite ends of the cavity, each wall being provided with an opening therethrough, a cap rotatably carried within the cavity and in engagement with the wall at one end of the cavity, the cap having a passage therethrough in alignment with the said openings in said walls, the passage of the cap being threaded at a portion thereof adjacent the wall of the housing which is engaged by the cap so that the cap is threadedly attachable to a valve stem which extends through the wall of the housing and into the passage, the cap having an engagement portion at the end thereof opposite said threaded portion thereof, an elongate pin within the cavity of the housing and extending into the passage of the cap, the pin having a head engageable with the wall of the housing which is opposite the wall engaged by the cap, the head of the pin being of sufficient size to close the opening through said wall when the head is in engagement therewith, a spring member in engagement with the pin and with the cap, the spring member urging the pin toward the wall which is engageable by the head of the pin so that the opening through said wall is normally closed, the head of the pin having a portion engageable with the engagement portion of the cap for rotation of the cap with rotation of the pin, the head of the pin having a key engagement portion for rotation of the pin, the end of the pin opposite the head thereof being engageable with a valve member within the valve stem to which the cap is attached, the pin thus being movable to operate the valve member.

4. A wheel cover lock and valve stem cap unit comprising a housing, a cap rotatably carried within the housing, the cap having an engagement portion, the cap having a passage therethrough adapted to receive an end of a valve stem, the housing having a wall provided with an inlet opening therethrough leading to the passage of the cap, an elongate pin loosely disposed within the passage of the cap, the pin having a head end engageable with said wall and partially movable into said inlet passage for closing thereof, spring means engaging the pin and the cap urging the pin toward said inlet passage for closing thereof, the pin being axially movable so that the end thereof opposite the head end is engageable with a valve member within said valve stem for operation of the valve member, the head end of the pin having a key abutment portion so that the pin is rotatable and axially movable by means of a suitable key member in engagement with said key abutment portion.

5. For a wheel having a wheel cover and a tire provided with a valve stem extending through an aperture in the wheel cover, a lock device comprising a housing larger than the aperture in the wheel cover so that the housing cannot pass through said aperture, the housing having a cavity therein and extending therethrough, a cap rotatably disposed within the cavity, the cap having a passage therethrough, the cap having means for threaded attachment to the valve stem, the cap also being provided with an engagement portion for rotation thereof, a pin member, means engaging the pin member urging movement thereof in a direction from said cap, the pin member having a portion engageable with the engagement portion of the cap, the pin member also having a key engagement portion forcing the pin member toward the cap for engaging the pin member with the cap for rotation thereof with respect to the housing.

6. For use with a wheel and tire assembly provided with a wheel cover having an aperture therethrough and with a valve stem extending through the aperture in the wheel cover, the valve stem having a threaded portion and a valve core within the valve stem, a lock unit comprising a housing having extending portions preventing movement thereof through the aperture, a cap member rotatably carried within the housing, the cap member having threaded means for attachment to the threaded portion of the valve stem, pin means extending through the cap member and engageable with the valve core within the valve stem the cap member having an engagement portion, the pin means having a portion engageable with the engagement portion of the cap member for rotation of the cap member, and means engageable with the pin means for rotation thereof.

7. For use with a wheel and tire assembly provided with a wheel cover having an aperture therethrough and with a valve stem extending through the aperture in the wheel cover, the valve stem having a threaded portion and a valve core within the valve stem, a lock unit comprising a housing, a cap member rotatably carried within the housing, the cap member having a threaded means for attachment to the threaded portion of the valve stem, the cap member having an engagement portion for rotation thereof, pin means within the housing and engageable with the engagement portion of the cap member for rotation thereof, and means engageable with the pin means for rotation thereof.

8. For a valve stem having a valve core therewithin, a lock assembly comprising a housing, a cap rotatably carried within the housing, the housing having a pair of openings leading to the cap, one of the openings being adapted to receive a valve stem extending therethrough, the cap having threaded means for attachment to the valve stem, and a control member within the housing engageable with the valve core within the valve stem for operation thereof, the control member also being engageable with the cap for rotation thereof.

9. A unitary wheel cover lock and valve stem cap comprising a housing provided with a cavity therein, a wall of the housing having an opening therein leading to the cavity, said opening being adapted to have a valve stem extend therethrough, connector means within the cavity attachable to a valve stem which extends through said opening, control means within the cavity and movable into engagement with said connector means for attachment thereof to the valve stem which extends through the opening, and key means engageable with the control means for operation thereof.

10. A unitary wheel cover lock and valve stem cap comprising a housing provided with a cavity therein, the housing having a plurality of openings leading to the cavity, one of said openings being adapted to have a valve stem extend therethrough, connector means within the cavity threadedly attachable to a valve stem which extends through said one of the openings, a control member within the cavity and movable into engagement with said connector means for threadedly attaching said connector means to the valve stem, and key means movable through another of said openings and engageable with the control member for operation thereof.

11. A vehicle wheel cover lock attachable to a valve stem comprising a housing, a cap member rotatably carried within the housing and threadedly attachable to a valve stem, a wrench within the housing, the cap member having means engageable by the wrench, the wrench being movable into engagement with said means of the cap member for rotation of the cap member, the housing having an opening therein leading to the wrench, and means movable through said opening and engageable with the wrench for moving the wrench into engagement with said means of the cap member and for rotation of the wrench.

References Cited in the file of this patent

UNITED STATES PATENTS

| | | |
|---|---|---|
| 2,747,940 | Tracy | May 29, 1956 |
| 2,778,215 | Redmond | Jan. 22, 1957 |
| 2,820,503 | Millat et al. | Jan. 21, 1958 |